3,529,035
HIGH STRENGTH SILICONE ELASTOMERS
Harry F. Lamoreaux, Schenectady, N.Y., assignor to General Electric Company, a corporation of New York
No Drawing. Filed May 1, 1968, Ser. No. 725,930
Int. Cl. C08g 47/04, 47/06
U.S. Cl. 260—825
11 Claims

ABSTRACT OF THE DISCLOSURE

Silicone elastomers having tensile strengths in excess of 3,000 p.s.i. are composed of $R_2'SiO$ units, $SiO_2$ units, and

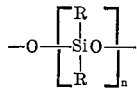

blocks, where $n$ has a value of at least 1,000. Elastomers within the scope of the present disclosure are made by reacting an acetoxy derivative of a resin containing $R_2'SiO$ units and $SiO_2$ units with a high molecular weight silanol-stopped polydiorganosiloxane gum. The high strength elastomer produced is an excellent coating material for shatter-proof light bulbs.

---

This invention relates to an organopolysiloxane which is curable to a tough, clear, elastomeric material and to the method of preparing such an organopolysiloxane.

Silicones, as is well known, have been found to be useful in highly diverse applications. Their applicability in the form of films, however, has been in the past limited due to lack of sufficient tensile strength. Attempts to remedy this problem by making the films thicker resulted in a further lowering of the tensile strength. The present invention, however, solves this problem by providing elastomeric silicone films having tensile strengths in excess of 3,000 p.s.i. These films not only have high tensile strength but may be stretched 1500% of their initial length.

The high strength films of the present invention are useful as walls for oxygen tents, for making surgical gloves by dip casting, encapsulating artificial hearts, as transparent bandage material, as an interlayer for safety glass, to coat soda bottles to reduce the incidence of injury to children caused by shattered glass, for coating light bulbs, television tubes, flash bulbs, etc., for making safety clothing, reverse osmosis diaphragms, packaging food to be cooked in the package, ultraviolet transmitting windows for greenhouses, inert drum liners, packages for transporting live fish, reactor windows, high tensile adhesives of the contact type, and in myriads of other applications where a high strength transparent inert elastomeric film is required.

The organopolysiloxane elastomers of the present invention consist of:

(1) Organosiloxane blocks of the general formula:

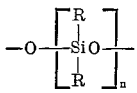

wherein each R is a monovalent hydrocarbon radical selected from the group consisting of alkyl radicals having up to 8 carbon atoms, aryl radicals, aralkyl radicals, alkenyl radicals, cycloaliphatic radicals, halogenated derivatives of the above radicals and cyanoalkyl radicals; $n$ has an average value of from 1000 to 7000, there being no more than 10 mole percent organosiloxy units other than dimethylsiloxy units, there being on each organosiloxane block two silicon-bonded oxygen atoms, each having an unsatisfied valence bond which is attached to a coupling unit bonded to the organopolysiloxane block through the silicon-bonded oxygen atoms, the coupling unit consisting of $SiO_2$ units and $R_2'SiO$ units wherein the ratio of $SiO_2$ units to $R_2'SiO$ units is from 4:6 to 5:5. Some of the oxygen atoms of the organosiloxane blocks are also common to the coupling unit.

I have unexpectedly discovered that such elastomers have exceptional tensile strengths when organopolysiloxane blocks containing more than 1000 units are present in the elastomers. A practical range based upon a balance of availability and utility is a range of an average of 4,750 to 6,200 diorganosiloxy units per organopolysiloxane block. The preferred value of this range is 6,200 diorganosiloxy units as the higher the number of units in the block, the higher the strength of the elastomer. The preferred blocks, the preference being based upon availability of starting materials, and smoothness of the reactions leading to the product, are composed entirely of dimethylsiloxy units.

The high strength elastomeric polysiloxanes of my invention are made by (a) forming a homogeneous mixture, in a solvent, of an acetoxy derivative of a resinous copolymer of $R_2'SiO$ units and $SiO_2$ units and a silanol chain-stopped polydiorganosiloxane gum having an average of from 1000 diorganosiloxane units to 6200 or more diorganosiloxy units, (b) evaporating the solvent and (c) heating said homogeneous mixture at an elevated temperature to cure the composition to a high strength elastomeric polysiloxane. The heating step is not required, but is preferred.

The resinous copolymer composed of $R_2'SiO$ units and $SiO_2$ units is prepared by cohydrolyzing a hydrolyzable diorganosilane, such as dimethyldiethoxysilane, with an alkylorthosilicate or the partial hydrolyzate of such alkylorthosilicate, such as condensed ethylorthosilicate. During the cohydrolysis of these two materials in the presence of a minor amount of water and in the presence of a suitable organic solvent such as dioxane, most of the silicon-bonded alkoxy groups are replaced by silicon-bonded hydroxyl groups through which the two organo-silicon materials condense to form siloxane linkages.

The solvent containing the resinous copolymer and in addition the alcohol formed by the cohydrolysis, is vacuum stripped from the resinous copolymer. Depending on the particular reaction condition employed and the reactant ratio, the resinous copolymer of $R_2'SiO$ and $SiO_2$ units contains from about 0.1 to 10%, by weight, of silicon-bonded hydroxyl groups.

The preferred method of preparing the resinous copolymer composed of $R_2'SiO$ units and $SiO_2$ units is by hydrolyzing diethoxydimethylsilane with a partial hydrolyzate of ethylorthosilicate. The diethoxydimethylsilane and the partial hydrolyzate of ethylorthosilicate are cohydrolyzed in a water-dioxane solvent and most of the silicon-bonded alkoxy groups are replaced with silicon-bonded hydroxyl groups through which the two organo-silicon materials condense to form siloxane linkages. The solvent system is then vacuum stripped from the condensed resin.

The next step in the practice of the present invention is the formation of the acetoxy derivative of the resin containing $R_2'SiO$ units and $SiO_2$ units. This is accomplished by refluxing the resin with acetic anhydride, preferably in a solvent such as dioxane. Forming the acetoxy derivative usually takes from 5 to 12 hours. After the acetoxy derivative has been formed, the solvent is vacuum stripped.

The acetoxy derivative is then dissolved in an inert organic solvent. The amount of solvent used is not critical and is preferably equal in weight to the weight of the resin. In general, this solvent is either an aliphatic or aromatic hydrocarbon or a halogenated derivative thereof, since these solvents are most readily available commercially. Of particular use as solvents are benzene, toluene, xylene, trichloroethylene, and both aliphatic and aromatic mineral spirits. For practices of the present invention, the amount of solvent in which the resinous copolymer is dissolved can vary within extremely wide limits, satisfactory results being obtained with solutions of the resinous copolymer containing from 10 to 90% solvent. Preferably, the resinous copolymer solution has a solids content of from about 50 to 70%.

The ratio of the number of $SiO_2$ units of $R_2'SiO$ units in the resinous copolymer can vary within wide limits, so long as the ratio of $SiO_2$ units to $R_2'SiO$ units is at least 35:65. However, for optimum results, it is preferred to have a ratio of from 4:6 to 5:5 of $SiO_2$ units to $R_2'SiO$ units. A ratio of less than 4:6 causes a decrease in the tensile strength of the final product and a ratio greater than 5:5 can cause excessive cross-linking of the final product.

While the exact chemical structure of the resulting copolymer is not known with certainty, it is known that the solution contains a number of silicon-bonded acetoxy groups. In general, the acetoxy groups comprise from about 4 to 40% by weight of the total weight of the copolymer.

The $R_2'SiO$ units can be joined to $SiO_2$ units and/or to other $R_2'SiO$ units. When the $R_2'SiO$ units are joined together, the majority of the chains formed are tetraorganodisiloxy chains,

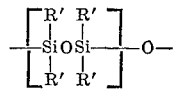

with a minor portion of the hexaorganotrisiloxy chains,

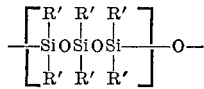

present. Thus, the resinous copolymer contains $SiO_2$ units joined to

units, and

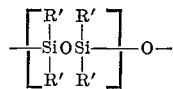

and

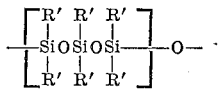

chains, the oxygen valences not satisfied by silicon or carbon-bonding being satisfied by bonding to a hydrogen atom to form a silanol group.

The $R_2'SiO$ units and the

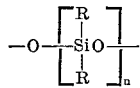

blocks present in the resinous copolymer are generally those in which the R and R' groups are methyl groups. However, also applicable to the present invention are those $R_2'SiO$ units and

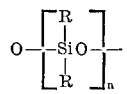

blocks in which the R and R' groups are other monovalent hydrocarbon radicals, such as, for example, lower alkyl radicals having up to 8 carbon atoms, e.g., ethyl, propyl, isopropyl, butyl, isobutyl, octyl, etc. radicals; mononuclear and binuclear aryl radicals, e.g., phenyl, naphthyl, xylyl, tolyl, diphenyl, etc. radicals; mononuclear aryl lower alkyl radicals, e.g., benzyl, phenylethyl, etc. radicals; alkenyl radicals, e.g., viny, allyl, etc. radicas; cycloaliphatic radicals, e.g., cycloheptyl, cyclohexyl, etc. radicals; halogenated derivatives of the above radicals, including chloromethyl, chloropropyl, dibromophenyl, etc., radicals, and cyanoalkyl radicals, e.g., beta-cyanoethyl, gamma-cyanopropyl, beta-cyanopropyl, etc. radicals. Preferably, where radicals other than methyl radicals are included in $R_2'SiO$ units and

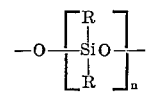

and blocks each also contain at least 50% of dimethylsiloxy units.

The alkylorthosilicates employed in the practice of the present invention have the formula:

(1)  $(R''O)_4Si$ where R'' is a lower alkyl radical or a lower hydroxy alkyl radical, such as methyl, ethyl, propyl, butyl, octyl, hydroxyethyl, etc. radicals. Preferably, the alkylorthosilicate employed is ethylorthosilicate or the partial hydrolysis product thereof, such as an ethylorthosilicate which has been condensed to contain an average of from 2 to 10 siloxy units.

The silanol chain-stopped polydiorganosiloxane gums employed in the practice of the present invention can be represented as having the formula:

(2) 

where R is as above defined and $n$ has a value of at least 1,000. Preferably, $n$ has a value between 5,400 and 6,200, and not more than 10 mole percent of the organosiloxy units are other than dimethylsiloxy units.

Polydiorganosiloxanes are well known in the art and are described, for example, in Pat. 2,843,555—Berridge. Preferably, the silanol chain-stopped polydiorganosiloxane employed in the practice of the present invention is a silanol chain-stopped polydimethylsiloxane gum having a silanol content of from 0.034% to 0.0075% by weight, preferably 0.0085 to 0.0075 percent by weight and an intrinsic viscosity of 0.94 to 1.98 deciliters per gram. The intrinsic viscosities of all the gums used were determined in toluene at 25° C. The concentrations of the gums in toluene, used to make the determination were 2 grams per liter, 1 gram per liter and 0.5 gram per liter. I have unexpectedly found that films prepared from gums have tensile strengths which increase in proportional to the increase in the number of siloxy units per gum molecule. The most preferable gum contains an average of 6,200 dimethylsiloxy units and has an intrinsic viscosity of 1.98 deciliters per gram. This represents the highest molecular weight gum which can be used in a practical sense based upon cost and the present day technology used to make and utilize gums.

In the practice of the present invention, the silanol chain-stopped gum is dissolved in a suitable solvent. The solution of the acetoxy derivative of the resinous copolymer, the gum solution and a catalyst are then mixed together in any convenient fashion. It is found that the resin solution and the gum solution are completely miscible so that a uniform homogeneous solution of the resin and the gum is obtained upon mixing. The solubility of the two ingredients varies to some extent, however, depending on the resins solids content of the resinous copolymer solution. Sometimes mixing for several minutes is required to form a homogeneous solution when a high solids resin solution and a gum solution are employed. The proportions of the acetoxy derivative of the resinous copolymer and the silanol chain-stopped gum can vary within wide limits, e.g., a weight ratio of 1:2 to 1:10 parts of the resinous copolymer to the chain-stopped gum may be employed. However, for optimum results, it is preferred to have a weight ratio of from 1:3 to 1:4 of the resinous copolymer to the silanol chain-stopped gum.

The organopolysiloxane elastomer of the present invention is formed by evaporating the solvent, then curing the mixture of the siloxane gum and resinous copolymer. The resinous copolymer forms coupling units which join together long polysiloxy chains derived from the gum molecules. The coupling units are composed of $R_2'SiO$ units joined together or joined to $SiO_2$ units. When the $R_2'SiO$ units of the coupling unit are joined together, the majority of the chains formed are tetraorganodisiloxy chains,

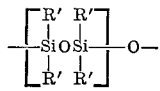

with a minor proportion of hexaorganotrisiloxy chains,

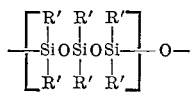

present.

The choice of the particular catalyst which can be employed to cure the silicone composition after removal of the solvent will depend on a number of factors. For example, occasionally an active catalyst, such as stannous octoate, will cause the solution to gel immediately, in which case a less active catalyst, such as dibutyl tin dilaurate is required.

Of the catalysts used in the practice of the present invention, the preferred catalyst is stannous octoate. Other catalysts, however, may also be mentioned, for example, metal salts of organic carboxylic acids and, in particular, the organic carboxylic acid salts of metals such as lead, tin, zinc, iron, cobalt, manganese, etc. The organic carboxylic acid portion of these salts include any of the well known organic carboxylic acids which, in their metal salt form, are conveniently used as paint driers. These acid derivatives includes the acetates, octoates, butyrates, naphthanates, etc. Among the examples of such metal salts include zinc octoate, lead acetate, lead naphthanate, and dibutyl tin dilaurate. Where these metal salt curing agents are applied, they are used in an amount equal to about 0.01 to 2% by weight of the metal from which the metal salt is derived. The percent by weight is based upon the total weight of resin and gum solids in solution.

The elastomeric polysiloxanes of the present invention are usually in the form of supported or unsupported films. These films are formed by covering a substrate with a solution containing the gum, resin, and catalyst described earlier, evaporating the solvent, then heating to in the neighborhood of 100° C. to cause the resin to cross-link the gum and form the high strength film. While cure can be effected at room temperature, it is preferred to employ some elevated temperature, such as a temperature of 50 to 150° C. to effect the cure. The time for effecting a cure at this elevated temperature varies from 1 to 4 hours.

When it is desired to use the solution to form an adhesive film between two components, both of the components are coated with the solution, the solvent is allowed to evaporate, and the components then placed in contact. The subsequent cure which occurs spontaneously results in a bond having extremely high strength.

The following examples are illustrative of the practice of my invention and are not intended for purposes of limitation. All parts are by weight. The condensed ethyl silicate used in the following examples is sold by Carbide and Carbon Chemicals Corporation of New York, New York, under the name of Ethyl Silicate 40 and is a mixture of ethyl polysilicates having about 40 percent available silica and is derived from the controlled hydrolysis of tetraethyl silicate, the formula for said polyethyl silicate being described as follows:

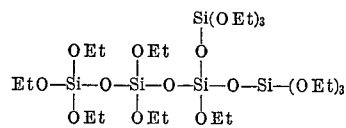

where Et represents the $C_2H_5$ group. Additional information for making the partial hydrolysis products of the monomeric organosilicon compounds described above may be found in the article by H. D. Hogan and C. A. Setterstrom entitled "Ethyl silicates" in Industrial and Engineering Chemistry, volume 39, page 1364, No. 11 (1947).

EXAMPLE 1

A three-necked flask was charged with 51.6 parts of dimethyldiethoxysilane, 48.4 parts of condensed ethyl silicate, 29.3 parts of water, and 300 parts of dioxane. The charge was heated under a packed column until the head temperature reached 100° C. At this point, 83 parts of acetic anhydride was added and the charge was refluxed for 12 hours. The dioxane, acetic acid which formed during the reaction and excess acetic anhydride were then removed by vacuum distillation. The resinous copolymer which formed contained $SiO_2$ units and $(CH_3)_2SiO$ units in a ratio of 4:6. The resinous copolymer was dissolved in toluene at 50% solids. A blend was formed of 5.2 grams of the resin solution and 74 grams of a 10% solution of a silanol end-stopped polydimethylsiloxane gum in toluene. The gum used had an intrinsic viscosity of 1.3 deciliters per gram, a silanol content of 0.01%, and contained 4,750 dimethylsiloxy units. The final solution contained on a solids weight basis, 26% of resin and 74% of gum. To the blend was then added 0.5 gram of stannous octoate catalyst. The catalyzed solution was poured into a 4 inch by 6 inch tin tray, allowed to stand overnight at room temperature to evaporate the solvent, and then cured for an hour at 100° C. The film produced had a tensile strength of 2,055 p.s.i. and an elongation of 800%.

EXAMPLE 2

Example 1 was repeated except that the ratio of condensed ethyl silicate to dimethyldiethoxysilane was changed in order to provide a ratio of 45 $SiO_2$ units to 55 $(CH_3)_2SiO$ units in the resin. The elastomeric film produced had a tensile strength of 2,320 p.s.i. at 1055% elongation.

EXAMPLE 3

Example 1 was repeated except that the quantities of condensed ethyl silicate and dimethyldiethoxysilane were changed to provide a resin having a ratio of $SiO_2$ units to $(CH_3)_2SiO$ units of 5:5. The elastomer produced using such a resin as a cross-linking agent had a tensile strength of 2,250 p.s.i. at 1500% elongation.

EXAMPLES 4 AND 5

The effect of variation in the molecular weight of the silanol-stopped gums is shown with these two examples. In both the examples, Example 1 was repeated exactly except that the gum present in the 74 parts of the 10% gum solution was different than that of Example 1.

A gum was used having an intrinsic viscosity of 1.35, a silanol content of 0.0085% by weight, and containing 5400 dimethylsiloxy units. The elastomeric film produced had a tensile strength of 2,160 pounds at 900% elongation.

When a gum having an intrinsic viscosity of 1.98 deciliters per gram, a silanol content of 0.0075% by weight, and containing 6200 dimethylsiloxane units was employed, an elastomeric film having a tensile strength of 2,940 p.s.i. at 1075% elongation was produced.

EXAMPLE 6

A three-necked flask was charged with 51.6 parts of dimethyldiethoxysilane, 48.4 parts of condensed ethyl silicate, 29.3 parts of water, and 300 parts of dioxane. The charge was heated under a packed column until the head temperature reached 99° C. At this temperature, 185 parts of the solvent were allowed to distill from the reaction mixture. The resinous copolymer which had formed had a silanol content of 4.75% by weight. To the three-necked flask containing the resinous copolymer was added 83 parts of acetic anhydride, and the charge was refluxed for 12 hours. The dioxane, acetic acid which formed during the reaction and excess acetic anhydride were then removed by vacuum distillation. The resinous copolymer formed contained $SiO_2$ units and $(CH_3)_2SiO$ units in a ratio of 4:6. The acetoxy content of the resinous copolymer was 10.1% by weight. The resinous copolymer was then dissolved in toluene at 50% solids. A blend was formed of 5.2 grams of the resin solution and 74 grams of a solution of a silanol end-stopped polydimethylsiloxane gum in toluene. The gum used had an intrinsic viscosity of 1.98 deciliters per gram, a silanol content of 0.0075% by weight, and contained 6200 dimethylsiloxy units. To the blend was then added 0.5 gram of stannous octoate catalyst. The catalyzed solution was poured into a 4 inch by 6 inch tray, allowed to stand overnight at room temperature to evaporate the solvent, and then cured for one hour at 100° C. The film produced had a tensile strength of 2,545 p.s.i. and an elongation of 1160%.

EXAMPLE 7

A three-necked flask was charged with 51.6 parts of dimethyldiethoxysilane, 48.4 parts of condensed ethyl silicate, 29.3 parts of water, and 300 parts of dioxane. The charge was heated under a packed column until the head temperature reached 100° C. Solvent and ethyl alcohol which had formed during the condensation were then removed by distillation. The distillate weighed 347 grams. The resinous copolymer which had formed contained 6.25 percent by weight silanol. At this point, 83 parts of acetic anhydride was added and the charge was refluxed for six hours. The dioxane, acetic acid which formed during the reaction and excess acetic anhydride were then removed by vacuum distillation. The acetoxy derivative of the resinous copolymer contained $SiO_2$ units and $(CH_3)_2SiO$ units in a ratio of 4:6 and had an acetoxy content of 4.0% by weight. The resinous copolymer was dissolved in toluene at 50% solids. A blend was formed of 5.2 grams of the resin solution and 74 grams of a 10% solution of a silanol end-stopped polydimethylsiloxane gum in toluene. The gum used had an intrinsic viscosity of 1.98 deciliters per gram, a silanol content of 0.0075% by weight, and contained an average of 6200 dimethylsiloxy units. To this blend was added 0.5 gram of stannous octoate catalyst. The catalyzed solution was poured into a 4 inch by 6 inch tray, allowed to stand overnight at room temperature to evaporate the solvent, and then cured for one hour at 100° C. The film produced had a tensile strength of 3070 p.s.i. and an elongation of 1300%.

EXAMPLE 8

A three-necked flask was charged with 51.6 parts of dimethyldiethoxysilane, 48.4 parts of condensed ethyl silicate, 20.3 parts of water, and 300 parts of dioxane. The charge was heated under a packed column until the head temperature reached 100° C. Solvent and ethyl alcohol which had formed during the condensation were then removed by distillation. The distillate weighed 347 grams. The resinous copolymer which had formed contained 6.25 percent by weight silanol. At this point, 83 parts of acetic anhydride was added and the charge was refluxed for six hours. The dioxane, acetic acid which formed during the reaction and excess acetic anhydride were then removed by vacuum distillation. The acetoxy derivative of the resinous copolymer contained $SiO_2$ units and $(CH_3)_2SiO$ units in a ratio of 4:6 and had an acetoxy content of 4.0% by weight. The acetoxy derivative of the resinous copolymer was dissolved in toluene at 50% solids. A blend was formed of 5.2 parts of the resin solution and 74 parts of a 10% solution of a silanol end-stopped polydimethylsiloxane gum in toluene. The gum used had an intrinsic viscosity of 1.98 deciliters per gram, a silanol content of 0.0075 by weight, and contained an average of 6,200 dimethylsiloxy units. To this blend was added 0.5 part of stannous octoate catalyst. A standard 60 watt light bulb was immersed, except for the base, in the solution, removed and the solvent was allowed to evaporate from the surface of the bulb overnight at room temperature. The coated bulb was then placed in an oven and maintained at 100° C. for one hour.

The light bulb was used to illuminate a hood for a period of six weeks, being subject to intermittent use during this period. The light bulb functioned normally. The bulb was then dropped onto the floor from a height of three feet. The area of impact of the light bulb, instead of shattering, was flattened and the broken pieces of glass remained firmly bonded to the light bulb coating.

While the foregoing examples have illustrated many of the variables within the scope of the present invention, it should be understood that many modifications of the present invention are possible within the skill of the art. For example, where desired, fillers may be added to the compositions where these fillers will not have an adverse effect on the film produced. Suitable fillers include silica aerogel, fumed silica, precipitated silica, diatomaceous earth, calcium carbonate, and the like.

What I claim as new and desire to secure by Letters Patent of the United States is:

1. An organopolysiloxane elastomer consisting of:
    (1) organopolysiloxane blocks of the general formula:

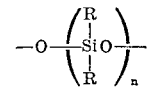

wherein each R is a monovalent hydrocarbon radical selected from the group consisting of alkyl radicals having up to 8 carbon atoms, mononuclear and binuclear aryl radicals, mononuclear aryl lower alkyl radicals, alkenyl radicals, cycloaliphatic radicals, halogenated derivatives of the above radicals and cyanoalkyl radicals; $n$ has an average value of from 1000 to 7000, there being no more than 10 mole percent organosiloxy units other than dimethylsiloxy units, there being on each organopolysiloxane block two silicon-bonded oxygen atoms, each having an unsatisfied valence bond which is attached to,
    (2) a coupling unit bonded to the organopolysiloxane block (1) through the silicon-bonded oxygen atoms which oxygen atoms are also common to the coupling unit and described above as each having an unsatisfied valence bond, the coupling unit consisting of $SiO_2$ units and $(R_2'SiO)_{n'}$ units wherein the ratio of $SiO_2$ units to $R_2'SiO$ units is from 4:6 to 5:5, R' is selected from the same group as R, and $n'$ has a value of 1 to 3.

2. The organopolysiloxane elastomer of claim 1 wherein $n$ has an average value of from 4,750 to 6,200.

3. The organopolysiloxane elastomer of claim 1 wherein $n$ has an average value of 6,200.

4. The organopolysiloxane elastomer of claim 1 in the form of a film.

5. The organopolysiloxane elastomer of claim 1 wherein all of the R and R' groups are methyl radicals.

6. An organopolysiloxane elastomer of claim 1 wherein the ratio of organopolysiloxane blocks to coupling units on a weight basis is from 2 to 10 parts of organopolysiloxane blocks, per part of coupling unit.

7. An inert organic solvent solution of (1) 2 to 10 parts of an organopolysiloxane of the formula:

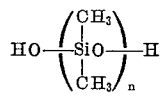

where $n$ has a value of from 5,400 to 6,200 and (2) one part of an organopolysiloxane resin containing from 4 to 40 percent by weight of silicon-bonded acetoxy groups, the siloxane content of the resin being composed of $SiO_2$ units and

units wherein the ratio of $SiO_2$ units to

units is from 4:6 to 5:5, where $n'$ has a value of from 1 to 3.

8. A method of producing an organopolysiloxane elastomer consisting of:
(A) forming an inert organic solvent solution of:
(1) an organopolysiloxane of the formula:

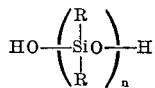

where $n$ has a value of 1,000 to 7,000 and R is a monovalent hydrocarbon radical selected from the group consisting of alkyl radicals having up to 8 carbon atoms, mononuclear and binuclear aryl radicals, mononuclear aryl lower alkyl radicals, alkenyl radicals, cycloaliphatic radicals, halogenated derivatives of the above radicals and cyanoalkyl radicals,
(2) an organopolysiloxane resin containing from 4 to 40 percent of silicon-bonded acetoxy groups, the resin being composed of $SiO_2$ units and $(R_2'SiO)_{n'}$ units wherein the ratio of $SiO_2$ units to $R_2'SiO$ units is from 4:6 to 5:5, and $n'$ has a value of one to three and R' is selected from the same group as R,
(B) applying the solution to a surface,
(C) evaporating the solvent, and
(D) curing the residue to a film.

9. A method of producing an organopolysiloxane elastomer according to claim 8 wherein $n$ has an average value of from 5,400 to 6,200.

10. A method of producing an organopolysiloxane elastomer according to claim 8 wherein R and R' are methyl radicals.

11. A method of producing an organopolysiloxane elastomer according to claim 10 wherein $n$ has an average value of from 5,400 to 6,200.

References Cited

UNITED STATES PATENTS

| | | | |
|---|---|---|---|
| 2,985,546 | 5/1961 | Leavitt | 260—825 |
| 3,094,497 | 6/1963 | Hyde | 260—46.5 |
| 3,127,363 | 3/1964 | Nitzsche et al. | 260—825 |
| 3,294,718 | 12/1966 | Antonen | 260—825 |
| 3,440,205 | 4/1969 | Chadha et al. | 260—46.5 |
| 3,440,206 | 4/1969 | Pande et al. | 260—46.5 |

SAMUEL H. BLECH, Primary Examiner

U.S. Cl. X.R.

3—1; 47—17; 99—171; 117—123; 128—156, 191; 156—329; 161—193; 260—18, 33.6, 33.8, 37, 46.5; 313—315